Feb. 11, 1969   A. J. McCLUSKEY   3,426,368
PET CARRIER FOR VEHICLES
Filed March 9, 1967
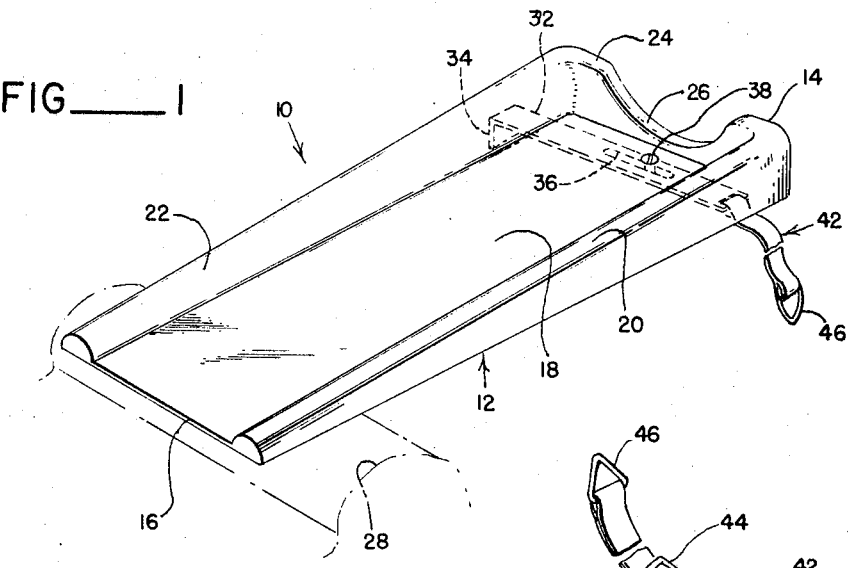
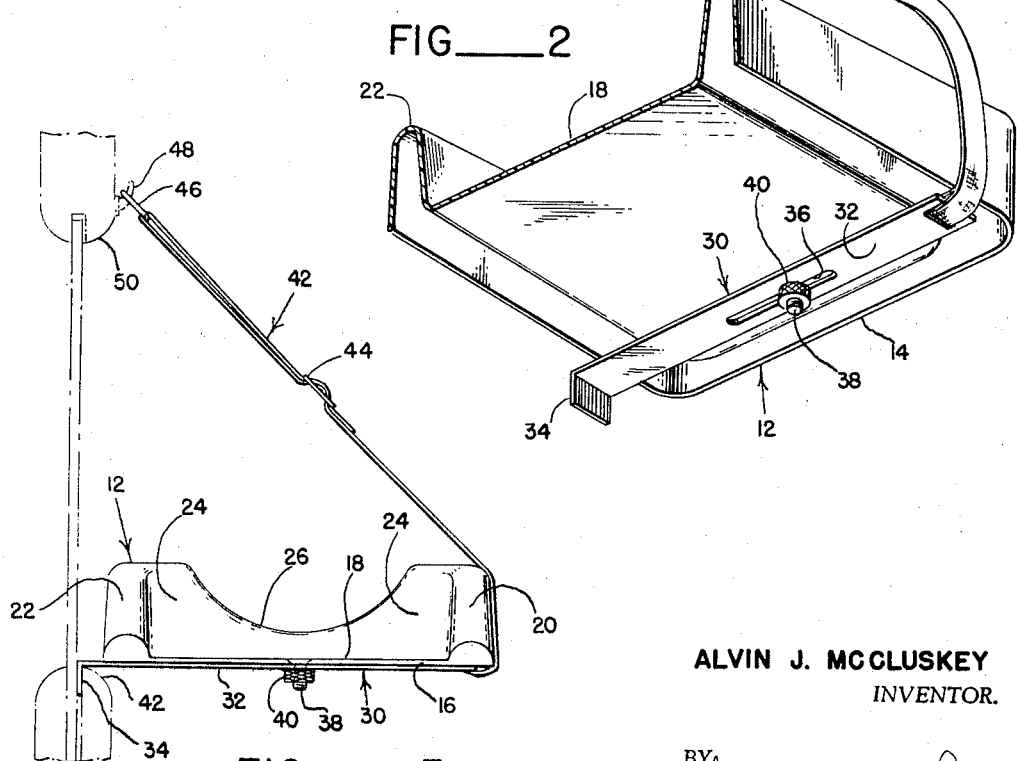
ALVIN J. McCLUSKEY
INVENTOR.
BY Graybeal, Cole & Barnard
ATTORNEYS United States Patent Office 3,426,368
Patented Feb. 11, 1969

3,426,368
PET CARRIER FOR VEHICLES
Alvin J. McCluskey, 4872 Columbia Drive S., Seattle, Wash. 98108
Filed Mar. 9, 1967, Ser. No. 621,953
U.S. Cl. 5—94                6 Claims
Int. Cl. A47d 7/04; A47c 17/84

ABSTRACT OF THE DISCLOSURE

Pet carrier or bed for vehicles in which an elongated body member is supported at one end by the back rest of the vehicle's rear seat and wherein the front end of the carrier or bed is supported by a strap attached to the automobile hanger hook. The carrier can be used on either side of the vehicle and includes means for restraining it from swinging or sliding away from the side to which it is secured.

Background of the invention

This invention relates to and is concerned with providing a pet bed or carrier for vehicles by means of which the pet occupant is supported for comfortable riding on a level with the window sill. Inasmuch as pets prefer the shady side of a vehicle, the carrier is easily supported in position on either side of the vehicle without interference with vehicular occupants. The carrier, when not in use, may be removed with great ease and placed out of the way.

Description of prior art

The following United States patents are directed to some form of pet or animal vehicular support. It will be apparent that the structures therein involved are not pertinent to the features of the instant invention. They are United States Patents Numbers 1,912,514, 2,499,103, 2,706,819, 2,790,184, 2,869,146, and 3,037,216. The basic problem of the prior art devices reside in their complexity of structure and thus their high cost. The amount of metal supporting elements and linkages simply makes most of them impractical not only because of complexity and resultant cost, but also for their awkward shapes and sizes making storage quite awkward. Additionally, complexity creates difficulties in installing the carrier in vehicles.

Summary of the invention

The pet bed or carrier of this invention is comprised of an elongated body made preferably of plastic, although such other materials as wood or metal would be acceptable. As contemplated, the body is generally rectangular in shape with rigidizing raised side edges for strength and for preventing the pet from sliding off the carrier when sleeping. On the underside of the bed is an L-shaped bracket having a short depending leg. The bracket has a slot through which projects a rivet or bolt. The bracket can be turned so that the depending leg is on either side of the body for use on either side of the interior of the vehicle. A strap is attached to the end of the bracket opposite the depending leg and on the free end of the strap is a loop or clip for engaging the hanger hook above the window. Thus one end of the body rests on the back rest of the rear seat while the front end of the body is held by the strap. A slot in the bracket permits the bed to be held against the window or sill. The bracket is shorter than the width of the body so that the strap will bear against the body and hold it in position against the window or sill.

It is therefore among the features of this invention to provide a pet carrier or bed for vehicles which is light in weight, economical to produce, and easy and convenient to use. Another feature of the invention is to supply a car bed which, because of its simplicity of construction, will have low retail cost, and will be easily storable in a vehicle without fuss and bother. Yet another feature will be to provide a pet carrier or bed for vehicles that will require a minimum amount of space and thereby not inconvenience passengers in the vehicle. Still another feature of the invention will be to provide a pet carrier or bed which will be stable and effectively supported on conventional vehicle parts. A further feature is to provide a carrier or bed for pets which enables the pet to sit or lie at window level so that it can look out the window while lying down and at the same time receive the benefit of wind and fresh air moving through the window.

Other features, advantages and objects will appear from the following description and claims appended thereto, and from the annexed drawings, in which like reference characters designate like parts throughout the several views.

Brief description of drawings

FIG. 1 is a view in perspective showing the pet carrier and bed of this invention as it would rest on the back rest of the rear seat of a vehicle and showing details of the body configuration;

FIG. 2 is a partial view in perspective from beneath the carrier body showing the bracket and strap which are responsible both for support and stability of the carrier; and FIG. 3 is an end elevational view of the carrier showing how the supporting bracket engages the window sill of the vehicle and how the strap from the other end thereof attaches to the hanger hook above the window.

Description of the preferred embodiment

Referring now to the drawings, it will be seen that the pet carrier or bed is generally designated by the number 10. The bed is comprised of a body 12 which is generally rectangular in shape when viewed from above. Body 12 has a forward end 14 and a rear end 16 as well as main flat body portion 18. The sides of the bed 12 have raised edge walls or portions 20 and 22 extending generally from the front end 14 to rear end 16. Since it is preferred that the body 12 be made of a plastic material or resin reinforced glass fiber, the raised side edges 20 and 22 add rigidity and strength to the body. Furthermore, the raised side edges enable the pet to stay on the carrier while sleeping so that it will not slide off the flat portion 18. The raised side edges 20 and 22 can be seen to taper from a maximum height at the forward end to a lesser or minimum height at the rear end of the bed. The precise configuration of the body is not critical and thus it will be appreciated that the body of the bed does not have to be rectangular and that the rigidizing raised side edges do not have to taper as shown. Accordingly, a boat-shaped or oval-shaped bed is contemplated as well as raised side edges which do not necessarily taper.

At the forward end of the body is forward raised wall 24 having a concave-shaped or notched portion 26. The forward raised wall 24 prevents the pet from slipping forwardly off the carrier while the notched or hollowed-out portion 26 permits the animal to sleep or rest with his nose or snout protruding over the edge of the body as some pets like to do. With the bed supported by strap means, to be described hereinafter, attached to the hanger hook and by the back rest of the rear seat, it is not necessary that the rear end of the body have a raised wall portion to prevent the pet slipping rearwardly. Obviously, such a rear raised wall portion could be provided for the rear end of the body if desired. It can be left open because the rear end of the body is generally on a level with the shelf space behind the rear seat.

On the underside of the body is an elongated generally horizontally disposed relatively thin metal bracket generally designated by the number 30. The bracket has elongated horizontal leg portion 32 and a short depending generally vertically disposed leg portion 34. Bracket 30 is shorter than the body so the strap will push the bed against the window or sill. As can be seen, bracket 30 is located near the forward end of the carrier on the undersurface of the flat body portion 18. It will be noted that the bracket has an elongated slot portion 36 which receives a rivet or bolt or other holding means 38 having a head located on the upper side of flat portion 18 and extending through the body so that it protrudes from the bottom surface of the flat portion 18. When bracket 30 is on bolt or rivet 38 a nut 40 is loosely threaded on to the bolt or the rivet fastened loosely so that bracket 30 will not be restricted against free movement along the length of slot 36. Slot 36 is elongated so that lateral or side-to-side adjustments of the body and bracket may be made relative to each other when depending leg portion 34 has been placed in the window opening in sill 42. Thus, swaying is prevented so as to assist in holding the bed in one position. It will be understood that bolt or rivet 38 is received loosely enough in slot 36 so that bracket 30 can be turned 180°. In this way depending or restraining leg 34 can be located on either side of the body thus permitting use of the bed on either side of the interior of the vehicle.

At the end of bracket 30 opposite depending leg 34 is attached a strap generally designated by the number 42. The belt or strap is connected at one end to bracket 30 through an appropriate hole in the end of horizontal leg portion 32. It has a slack adjustment feature 44 as well as metal loop or clip 46 on the outer end. Loop 46 or some other attaching means detachably secures to the hanger hook 48 above upper window sill 50. Belt 42 can be of web construction or chain or some other appropriate means with a lengthening and shortening feature as well as the coacting hook, clip or retainer means 46 on the free end thereof for attaching to the car hanger hook 48. The hook, clip or retainer 46 may be plastic coated in order to eliminate scratching or marring.

In using the carrier, it is only necessary to decide on which side of the vehicle it is to be set up. Bracket 30 is then rotated so that depending leg 34 is on the side of the bed or carrier which will be next to the window. When depending leg 34 has been inserted in the window opening of the sill, strap 42 is attached to the hanger hook and since bracket 30 is shorter than the body width the strap forces the body against the sill or window by sliding action of bolt or rivet 38 in slot 36. After loop 46 is hooked over the vehicle coat hanger hook the strap length is adjusted so that the strap actually bears the weight of the bed and the animal. It will be appreciated that once the strap is adjusted it probably will not have to be touched again regardless of which side of the car on which the bed is to be used. The bed can be removed from its location in practically one motion and easily stored in the back of the rear seat, in the trunk, or even under the seat. A pad, mattress or blanket can be form-fitted to the body to make the pet more comfortable.

Depending leg 34 should be plastic coated so that it will not scratch or mar the window sill.

While the invention has been shown and described with reference to a preferred embodiment thereof, it will be understood by those skilled in the art that various changes in form and detail may be made therein without departing from the spirit and scope of the invention.

I claim:

1. A pet carrier and bed for a vehicle having a support portion and an overhead hook means spaced generally vertically above said support portion, comprising:
    a pet supporting platform having first and second opposed sides;
    a support portion engaging means on the first side of said platform; and
    a tension member interconnectable between the overhead hook means and the second side of said platform to support and hold it in a substantially horizontal position when supported on its first side by said engaging means and the supporting portion of the vehicle.

2. A pet carrier and bed according to claim 1, for a vehicle having a support portion in the form of an upwardly opening window recess, wherein said engaging means comprises a downwardly projecting member insertable into said window recess.

3. A pet carrier and bed according to claim 1, for a vehicle having a side located support portion and overhead hook means and a seat back portion spaced from said support portion and said overhead hook means, wherein said platform is elongated and includes an end portion positionable on said seat back portion.

4. A pet carrier and bed according to claim 1, including a transverse arm member extending laterally of, and generally below, said platform, with said engaging means being at the end of said member which is disposed adjacent the first side of said platform, and with the opposite end of said member including connector means for engaging said tension member.

5. A pet carrier and bed according to claim 4, including connector means connecting said arm member to said platform for both pivotal and lengthwise adjustment in position of said arm member relative to said platform.

6. A pet carrier and bed according to claim 5, wherein said connector means comprises an elongated axial slot in an intermediate portion of said arm member, a pin member secured to said platform and loosely received in said slot, and means for retaining said pin in said slot.

References Cited

UNITED STATES PATENTS

| 1,912,514 | 6/1933 | Curtis et al. | 5—118 |
| 1,928,731 | 10/1933 | Mattson | 108—44 |
| 2,706,819 | 4/1955 | McClure | 5—94 |
| 2,833,608 | 5/1958 | Tobias | 108—44 |
| 3,037,216 | 6/1962 | Stringer | 5—118 |
| 3,145,395 | 8/1964 | Rosman | 5—94 |

CASMIR A. NUNBERG, Primary Examiner.

U.S. Cl. X.R.

5—118